United States Patent
Pernleitner et al.

(10) Patent No.: US 11,905,852 B2
(45) Date of Patent: Feb. 20, 2024

(54) INTERMEDIATE ELEMENT FOR A BLADE/ROTOR DISC CONNECTION IN A ROTOR OF A TURBOMACHINE, ASSOCIATED ROTOR FOR A TURBOMACHINE, AND TURBOMACHINE

(71) Applicant: MTU AERO ENGINES AG, Munich (DE)

(72) Inventors: Martin Pernleitner, Munich (DE); Klaus Wittig, Munich (DE); Manfred Dopfer, Munich (DE); Dieter Freno, Munich (DE); Tino Hummel, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 17/627,815

(22) PCT Filed: Jul. 14, 2020

(86) PCT No.: PCT/DE2020/000154
§ 371 (c)(1),
(2) Date: Jan. 18, 2022

(87) PCT Pub. No.: WO2021/013280
PCT Pub. Date: Jan. 28, 2021

(65) Prior Publication Data
US 2022/0268164 A1    Aug. 25, 2022

(30) Foreign Application Priority Data
Jul. 19, 2019   (DE) .................. 10 2019 210 699.4

(51) Int. Cl.
*F01D 5/30*   (2006.01)
*F01D 5/32*   (2006.01)
(Continued)

(52) U.S. Cl.
CPC .......... *F01D 5/3007* (2013.01); *F01D 5/3092* (2013.01); *F01D 5/323* (2013.01);
(Continued)

(58) Field of Classification Search
CPC .... F01D 5/3007; F01D 5/3015; F01D 5/3092; F01D 5/323; F04D 29/322; F04D 29/34
See application file for complete search history.

(56) References Cited

U.S. PATENT DOCUMENTS 6,109,877 A * 8/2000 Gekht ..................... F01D 5/323
                                                    416/207
9,708,919 B2    7/2017 Dungs et al.
(Continued)

FOREIGN PATENT DOCUMENTS

DE   102017207445 A1   11/2018
EP        1643082 A1 *  4/2006  ............. F01D 5/323
(Continued)

OTHER PUBLICATIONS

English machine translation of JP 08-014002, Jan. 27, 2023.*
(Continued)

*Primary Examiner* — Christopher Verdier
(74) *Attorney, Agent, or Firm* — LEYDIG, VOIT & MAYER, LTD.

(57) ABSTRACT

An intermediate element is for a blade/rotor disk connection in a rotor of a fluid flow machine. The intermediate element is adapted to a shape of a blade root of a blade and to a blade root slot in a rotor disk for receiving the blade root such that, when arranged between the blade root and rotor disk, the intermediate element prevents contact between the blade root and rotor disk. The intermediate element has, on an outer surface that faces the rotor disk, at least one protrusion to reduce an air flow parallel to an axis of rotation of the rotor between the rotor disk and the intermediate element;

(Continued)

and on an inner surface that faces the blade root, a recess that corresponds to the at least one protrusion.

18 Claims, 6 Drawing Sheets

(51) Int. Cl.
    *F04D 29/32*     (2006.01)
    *F04D 29/34*     (2006.01)

(52) U.S. Cl.
    CPC ........... *F04D 29/322* (2013.01); *F04D 29/34* (2013.01); *F05D 2250/711* (2013.01); *F05D 2250/712* (2013.01)

(56) References Cited

U.S. PATENT DOCUMENTS

| | | | |
|---|---|---|---|
| 10,753,213 | B2 | 8/2020 | Pernleitner et al. |
| 2014/0234111 | A1* | 8/2014 | Dungs ..................... F01D 5/326 416/220 R |

FOREIGN PATENT DOCUMENTS

| | | | | |
|---|---|---|---|---|
| EP | 2562356 | A1 | 2/2013 | |
| EP | 2719864 | A1 | 4/2014 | |
| EP | 2832957 | A1 | 2/2015 | |
| EP | 3418498 | A1 | 12/2018 | |
| FR | 3075255 | A1 | 6/2019 | |
| GB | 135555 | A * | 6/1974 | ........... F01D 5/3007 |
| JP | 57143105 | A * | 9/1982 | ........... F01D 5/3092 |
| JP | 0626302 | A | 2/1994 | |
| JP | 0814002 | A | 1/1996 | |

OTHER PUBLICATIONS

English machine translation of JP 06-026302, Jan. 27, 2023.*
English machine translation of EP 3418498-A1, Jan. 27, 2023.*
English machine translation of FR 3075255-A1, Jan. 27, 2023.*
English machine translation of EP 2719864-A1, Jan. 27, 2023.*
English machine translation of EP 1643082-A1, Jan. 27, 2023.*
English machine translation of JP 57143105-A, Jan. 27, 2023.*

* cited by examiner

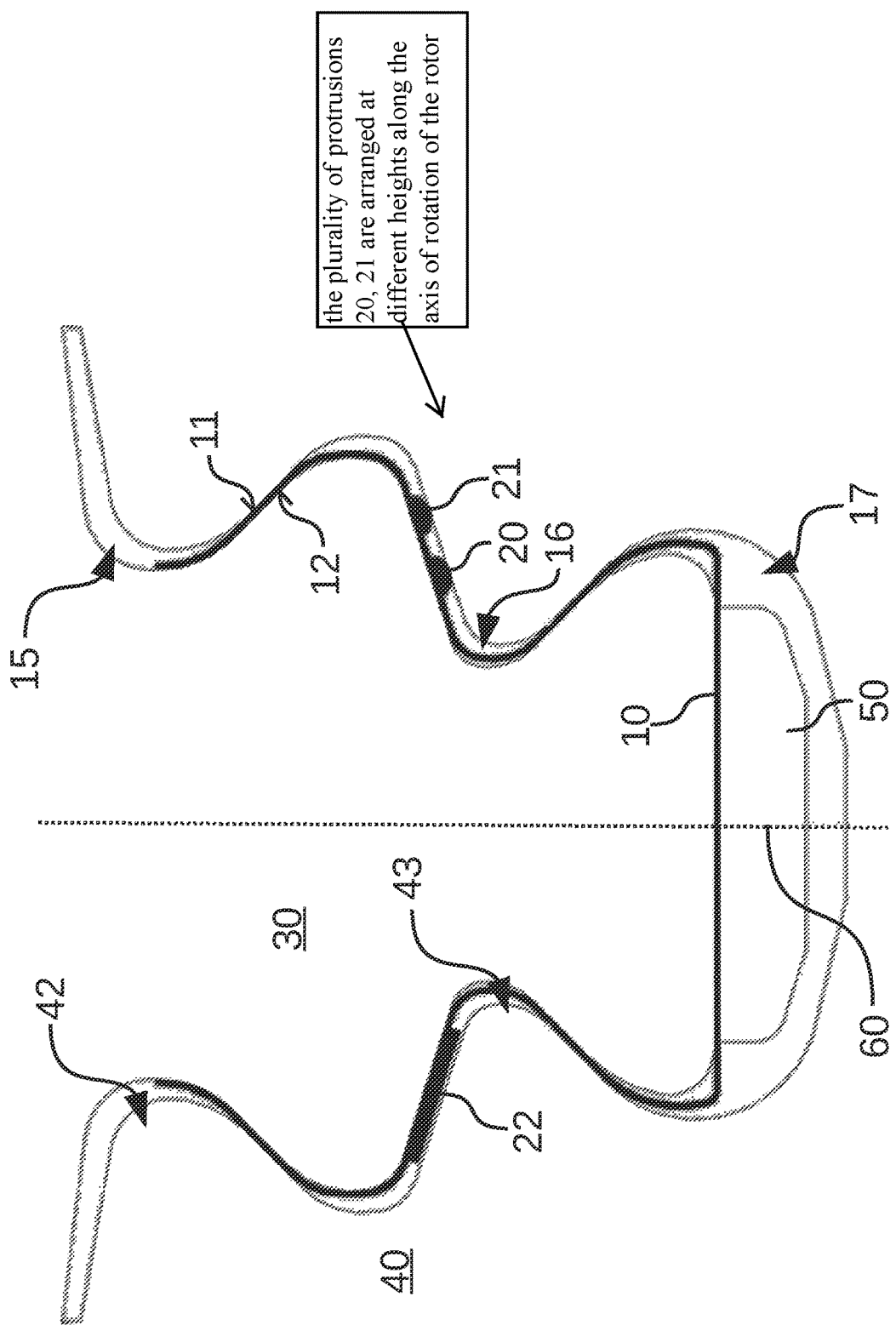

INTERMEDIATE ELEMENT FOR A BLADE/ROTOR DISC CONNECTION IN A ROTOR OF A TURBOMACHINE, ASSOCIATED ROTOR FOR A TURBOMACHINE, AND TURBOMACHINE

CROSS REFERENCE TO RELATED APPLICATIONS

This application is a U.S. National Phase application under 35 U.S.C. § 371 of International Application No. PCT/DE2020/000154, filed on Jul. 14, 2020, and claims benefit to German Patent Application No. DE 10 2019 210 699.4, filed on Jul. 19, 2019. The International Application was published in German on Jan. 28, 2021 as WO 2021/013280 A1 under PCT Article 21(2).

FIELD

The invention relates to an intermediate element for a blade/rotor disk connection in a rotor of a fluid flow machine and to a rotor for a fluid flow machine.

BACKGROUND

In fluid flow machines, an intermediate element in the form of an anti-wear sheet is often arranged between the blade and the rotor disk in order to reduce the wear in the event of high loads. As a result, however, the air-system surfaces may be changed, in particular due to additional tolerances introduced by the intermediate element. In turn, this can lead to more air traveling past the blade root, meaning that the air in the cavity downstream of the blade in the flow direction becomes hotter.

This can reduce the performance of the fluid flow machine. It is also possible that the fluid flow machine is damaged as a result, or that the service life of the fluid flow machine is shortened.

SUMMARY

In an embodiment, the present disclosure provides an intermediate element that is for a blade/rotor disk connection in a rotor of a fluid flow machine. The intermediate element is adapted to a shape of a blade root of a blade and to a blade root slot in a rotor disk for receiving the blade root such that, when arranged between the blade root and rotor disk, the intermediate element prevents contact between the blade root and rotor disk. The intermediate element has, on an outer surface that faces the rotor disk, at least one protrusion to reduce an air flow parallel to an axis of rotation of the rotor between the rotor disk and the intermediate element; and on an inner surface that faces the blade root, a recess that corresponds to the at least one protrusion.

BRIEF DESCRIPTION OF THE DRAWINGS

Subject matter of the present disclosure will be described in even greater detail below based on the exemplary figures. The features and advantages of various embodiments will become apparent by reading the following detailed description with reference to the attached drawings, which illustrate the following:

FIG. 6 is another cross-sectional view of the intermediate element, the rotor disk, and the blade from FIG. 1.

DETAILED DESCRIPTION

Figure 1:
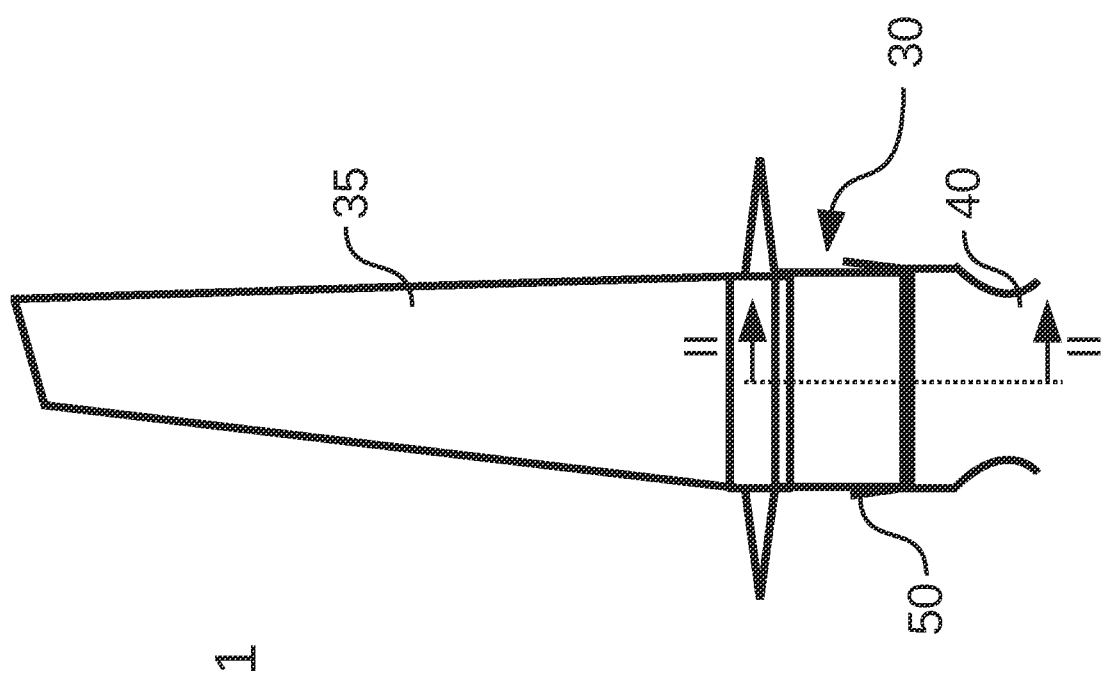
FIG. 1 is a side view of a blade arranged on a rotor disk, an embodiment of the intermediate element according to the invention being arranged between the blade and the rotor disk.

The present disclosure describes an intermediate element for a blade/rotor disk connection in a rotor of a fluid flow machine in which the passage of air at the blade root or between the blade root and rotor disk is reduced.

An aspect of the present disclosure provides an intermediate element for a blade/rotor disk connection in a rotor of a fluid flow machine, in particular in a rotor of an engine, the intermediate element being adapted to the shape of a blade root of the blade and to a blade root slot in a rotor disk for receiving the blade root in such a way that, when in the state arranged between the blade root and the rotor disk, the intermediate element prevents direct contact between the blade root and the rotor disk, characterized in that, on its outer surface that faces the rotor disk in the state arranged between the blade root and the rotor disk, the intermediate element has at least one protrusion for reducing an air flow parallel to the axis of rotation of the rotor between the rotor disk and the intermediate element, and in that, on its inner surface that faces the blade root in the state arranged between the blade root and the rotor disk, the intermediate element has a recess that corresponds to the at least one protrusion on the outer surface of the intermediate element.

One advantage of this is that only a small amount of air or a slight air flow can flow through the intermediate region between the blade root and the rotor disk. The performance of the fluid flow machine is thus only reduced to an insignificant extent. At the same time, immediate or direct contact between the blade root and the rotor disk is prevented, thereby reducing the wear to the blade root and the rotor disk. Moreover, the introduction of heat into the cavity downstream of the blade in the flow direction of the air is reduced. Damage to the fluid flow machine is thus prevented. This lengthens the service life of the fluid flow machine. In addition, the blade or blade root can be arranged in the blade slot or rotor disk with play, meaning that the blade can yield in the event of temporarily high aerodynamic loads and/or in the event of foreign bodies appearing on the blade, and then radially realign itself on its own.

An aspect of the present disclosure provides a rotor for a fluid flow machine, in particular for an engine, the rotor comprising a rotor disk and a multiplicity of blades, which are fastened to the rotor disk, an intermediate element according to any of the preceding claims being arranged between at least one blade root of a blade and the rotor disk in such a way that the blade root does not directly touch the rotor disk. The rotor comprising the intermediate element has advantages that correspond to the above-mentioned advantages of the intermediate element.

An intermediate element can be adapted to a shape of a blade root of a blade and to a blade root slot in a rotor disk, and can be arranged between the blade root and the rotor disk in such a way that the blade root does not directly touch the rotor disk, the intermediate element being able to have recesses and one or more protrusions that are complementary to the recesses, the protrusion or protrusions reducing an air flow in a direction parallel to the axis of rotation of the rotor.

According to one embodiment, the intermediate element is in the form of a sheet, in particular an anti-wear sheet, and has an axial sectional contour, i.e. a contour within a sectional plane perpendicular to the axial direction, that corresponds to an axial sectional contour of the blade root. In this case, the blade root can, for example, have a fir-tree, dovetail or hammerhead profile or a different profile.

The at least one protrusion or the plurality of protrusions can be formed by sheet notches, such as corrugations. In this case, the sheet preferably does not contain any through-holes at the relevant sites and/or can have, at the site of each protrusion, an unchanged or substantially unchanged thickness compared with regions without the protrusions.

According to one embodiment, when in the arranged state, the intermediate element surrounds the blade root, in particular entirely, at the surface thereof facing the blade root slot. This means that in some embodiments the intermediate element can entirely cover or directly adjoin the outer surface of the blade root (the outer surface not pointing in the axial direction) within the blade root slot.

According to one embodiment, on its outer surface that faces the rotor disk in the state arranged between the blade root and the rotor disk, the intermediate element has a plurality of protrusions for reducing an air flow parallel to the axis of rotation of the rotor between the rotor disk and the intermediate element, and, on its inner surface facing the blade root, has a plurality of recesses that each correspond to the protrusions. The advantage of this is that the space or the distance between the intermediate element and the rotor disk can be reduced or made smaller at a plurality of sites. The undesirable passage of air or air flow between the intermediate element and the rotor disk can thus be reduced even further. This prevents the performance of the fluid flow machine being reduced.

According to one embodiment, in the state arranged between the blade root and the rotor disk, at least some of the plurality of protrusions are arranged next to one another in a sectional plane perpendicular to the axis of rotation of the rotor disk. The advantage of this is that a particularly large space between the blade root and the rotor disk can be made smaller by a plurality of individual protrusions. This reduces the air flow between the intermediate element and the rotor disk particularly effectively.

According to one embodiment, in the state arranged between the blade root and the rotor disk, the plurality of protrusions are arranged at different heights along the axis of rotation of the rotor. The advantage of this is that the air flow can be interfered with or reduced particularly effectively. The air flow mass can thus be reduced in a technically simple manner.

According to one embodiment, in the arranged state, the at least one protrusion or the plurality of protrusions is/are arranged in the region of a non-load-bearing flank of the blade root and/or of a bottom of the blade root slot, and extend(s) away from the blade root. In operation, during which the non-load-bearing flanks of the blade roots are pulled against the respective mating flanks of the blade root slot due to centrifugal force, a gap can be produced specifically in this non-load-bearing region, and an air flow through this gap can be reduced by the at least one protrusion. The protrusion(s) can thus extend into this gap, in particular transversely to the axial sectional contour of the blade root.

According to one embodiment, the at least one protrusion is substantially in the shape of a flattened dome. An advantage of this is that the protrusion can be manufactured in a particularly simple manner in technical terms. The protrusion can be produced in a technically simple manner by producing a spherical recess in the intermediate element.

According to one embodiment, in the state arranged between the blade root and the rotor disk, the at least one protrusion is of a substantially rectangular shape in an axial sectional plane, i.e. a sectional plane perpendicular to the axis of rotation of the rotor disk. In this way, a particularly large region between the intermediate element and the rotor disk is closed by the protrusion. The air flow flowing through the space between the intermediate element and the rotor disk can thus be throttled or reduced even more.

According to one embodiment, in the state arranged between the blade root and the rotor disk, the at least one protrusion is arranged on an end of the intermediate element facing away from the axis of rotation of the rotor. An advantage of this is that the air flow flowing through the space between the intermediate element and the rotor disk can be or is reduced at sites at which the air flow is usually particularly high when there is no protrusion. As a result, the protrusion can be arranged at sites at which the distance between the intermediate element and the rotor disk is particularly high during rotation of the rotor, and can thus reduce the air flow particularly effectively.

According to one embodiment, in the state arranged between the blade root and the rotor disk, an axial securing element, in particular an axial securing sheet, for axially securing the blade and/or radially preloading the blade root is arranged between an end of the intermediate element facing the axis of rotation of the rotor, and the rotor disk. The advantage of this is that the blade root is radially preloaded. The positions of the protrusions can thus be positioned particularly precisely. In this way, the air flow through the space between the intermediate element and the rotor disk can be reduced particularly effectively. By means of the axial securing element, the blade can, for example, be axially secured by bending axial ends of the axial securing element, which project beyond the blade root, down in the radial direction such that they cover some regions of both the blade root and the rotor disk and thus secure the blade root axially in the rotor disk.

According to one embodiment, the at least one protrusion is formed in a planar portion of the intermediate element. An advantage of this is that the protrusion can be formed or molded in a technically simple manner. In addition, the air flow between the intermediate element and the rotor disk can be considerably reduced specifically in the region in which the distance between the intermediate element and the rotor disk is usually the greatest.

According to one embodiment, the at least one protrusion extends substantially over the entire width of the planar portion of the intermediate element, the width of the planar portion extending in a sectional plane that runs perpendicularly to the axis of rotation of the rotor disk. As a result, the air flow between the intermediate element and the rotor disk can be reduced even more. The dependent claims set out preferred embodiments.

In the following description, the same reference numerals have been used for identical and identically functioning parts.

Figure 2:
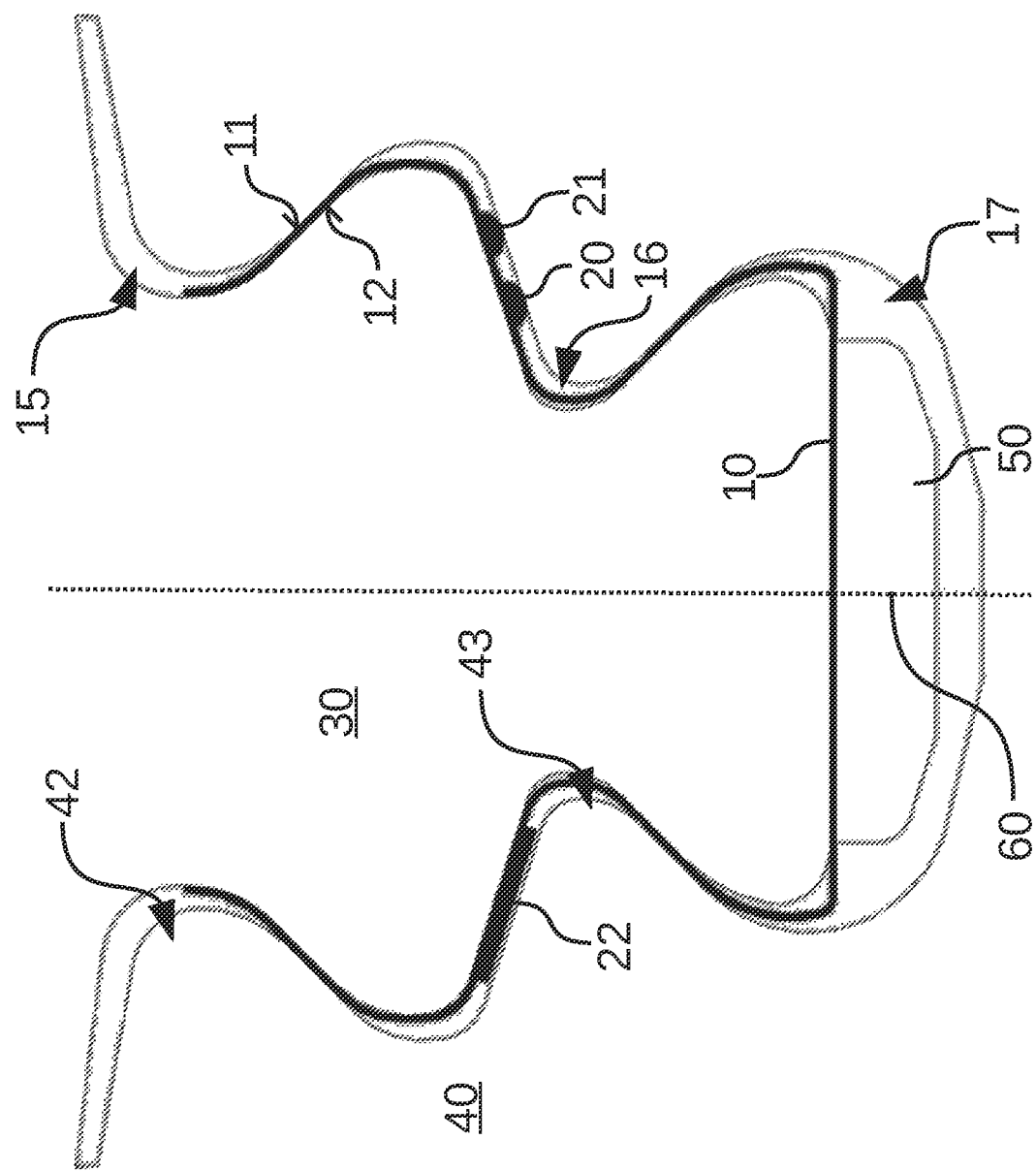
FIG. 2 is a cross-sectional view of the intermediate element, the rotor disk, and the blade from FIG. 1 along the line II-II.

FIG. 1 is a side view of a blade 35 fastened to a rotor disk 40, an embodiment of the intermediate element 10 according to the invention being arranged between the blade 35 and the rotor disk 40. FIG. 2 is a cross-sectional view of the intermediate element 10, the rotor disk 40, and the blade 35 from FIG. 1 along the line II-II.

A blade 35 of a fluid flow machine is form-fittingly connected to a rotor disk 40 or form-fittingly fastened to the rotor disk 40 by its blade root 30 (i.e. the bottom end of the blade 35). To receive the blade root 30, the rotor disk 40 has a blade root slot, which is a depression corresponding to the blade root 30. The rotor disk 40 thus has a plurality of bumps 42, 43 and depressions. The blade root 30 has a plurality of depressions and bumps corresponding to the bumps and depressions. The blade root 30 contains the bottom part of the blade 35, the bottom part being arranged or received within the blade root slot or in the depression in the rotor disk 40.

The fluid flow machine can be a gas turbine, for example an engine for an aircraft. In particular, the rotor can be the rotor of a high-pressure compressor of an engine. It is also conceivable for the rotor to be part of a low-pressure compressor of an engine.

An intermediate element 10 is arranged between the blade root 30 and the rotor disk 40. The shape of the intermediate element 10 is adapted to the shape of the blade root slot in the rotor disk 40 or to the shape of the blade root 30. This means that the shape of the intermediate element 10 substantially follows the profile shape of the space between the blade root 30 and the rotor disk 40.

The intermediate element 10 can be in the form of a sheet. The intermediate element 10 can be an anti-wear sheet. The intermediate element 10 reduces the wear to the blade root 30 or rotor disk 40. In addition, the intermediate element 10 reduces the occurrence of vibrations. The intermediate element 10 prevents direct contact or immediate contact between the blade root 30 and the rotor disk 40. In other words, the intermediate element 10 ensures that the blade root 30 does not immediately or directly touch the rotor disk 40. This is particularly relevant to the situation during the rotation of the rotor disk 40 when the blade root 30 is pushed away from the axis of rotation of the rotor in the radial direction. In FIG. 2, the axis of rotation of the rotor (not shown) is located below the shown part of the rotor and runs perpendicularly to the plane of the drawing in FIG. 2.

The distance between the blade root 30 and the rotor disk 40 is different in different regions, as can be seen particularly clearly in FIG. 2. In the planar or flat regions of the blade root 30 or rotor disk 40 in particular, there is a particularly large volume between the blade root 30 and the rotor disk 40. As a result, in the prior art large amounts of air can flow through this intermediate region in parallel with the axis of rotation of the rotor. This can make the air in the cavity downstream of the blade 35 hotter than intended or desired. To reduce this, the intermediate element 10 has one or more protrusions 20-22 on its outside or outer surface 11, or on its side facing the rotor disk 40. The intermediate element 10 thus also has a sealing function.

The protrusions 20-22 on the outside or outer surface 11 of the intermediate element 10 (the outside or outer surface 11 faces the rotor disk 40) correspond to recesses on the inside or inner surface 12 of the intermediate element 10. The inside or inner surface 12 of the intermediate element 10 faces the blade root 30.

The protrusions 20-22 on the outside or outer surface 11 of the intermediate element 10 and the recesses on the inside or inner surface 12 of the intermediate element 10 may be formed by indenting a part of the intermediate element 10. The protrusions 20-22 may be produced by pressing out a part of the intermediate element 10. Each protrusion 20-22 on the outside or outer surface 11 of the intermediate element 10 may then have a complementary or corresponding recess on the inside or inner surface 12 of the intermediate element 10.

In FIG. 2, in the left-hand part of the intermediate element 10, there is a protrusion 20-22 of the intermediate element on the outside or outer surface 11 of the intermediate element 10, the protrusion having a rectangular cross section. As a result, the distance or volume or space between the outside or outer surface 11 of the intermediate element 10 and the rotor disk 40 is reduced. Less air can thus flow through this intermediate region perpendicularly to the plane of the drawing in FIG. 2 since the protrusion 20-22 acts as a type of throttle or interfering element. Consequently, the air flow parallel to the axis of rotation, which likewise runs perpendicularly to the plane of the drawing in FIG. 2, is reduced. This is particularly relevant to the state during the rotation of the rotor or during the operation of the fluid flow machine.

In FIG. 2, in the right-hand part of the intermediate element 10, there are two protrusions 20-22 next to one another. The protrusions 20-22 are thus located at the same height along the axis of rotation of the rotor. The protrusions 20-22 are each shaped in the manner of a flattened dome. The recesses are typically of a shape corresponding thereto. Owing to the protrusions 20-22, the volume or space between the intermediate element 10 and the rotor disk 40 is reduced. This reduces the air flow or air-mass flow rate through the intermediate region between the intermediate element 10 and the rotor disk 40.

The protrusions 20-22, and thus also the recesses, are each located in planar or flat regions of the intermediate element 10. This means that, in the regions around each recess and each protrusion 20-22, the intermediate element 10 runs in a planar or flat manner on the outside or outer surface 11 and/or on the inside or inner surface 12; in particular, it means that the regions (immediately) around each recess or each protrusion 20-22 do not have any curvature. However, it is also conceivable for the protrusions 20-22 or recesses to be formed in bent or curved regions of the intermediate element 10.

The axis of rotation of the rotor is located below the middle of the blade root 30 in FIG. 2.

The intermediate element 10 has a flat or planar lower surface or underside facing the axis of rotation of the rotor. Between this flat or planar underside and the axis of rotation of the rotor, there is arranged an axial securing element, in particular an axial securing sheet 50. The axial securing sheet 50 presses against the intermediate element 10 in the radial direction such that the intermediate element 10 in turn presses or preloads the blade root 30 in the radial direction.

The intermediate element 10 can be formed symmetrically in relation to a plane of symmetry 60 running from the top downward in the middle of FIG. 2. However, as shown in FIG. 2, it is also possible for the intermediate element 10 to be formed asymmetrically in relation to the plane of symmetry 60.

The protrusion 20-22 having the rectangular cross section is formed such that the protrusion 20-22 almost touches the rotor disk 40 (in particular during rotation of the rotor). Only a very small space remains between the protrusion 20-22 and the rotor disk 40. The protrusions 20-22 on the right-hand side of the intermediate element 10 touch the rotor disk 40.

Figure 3:
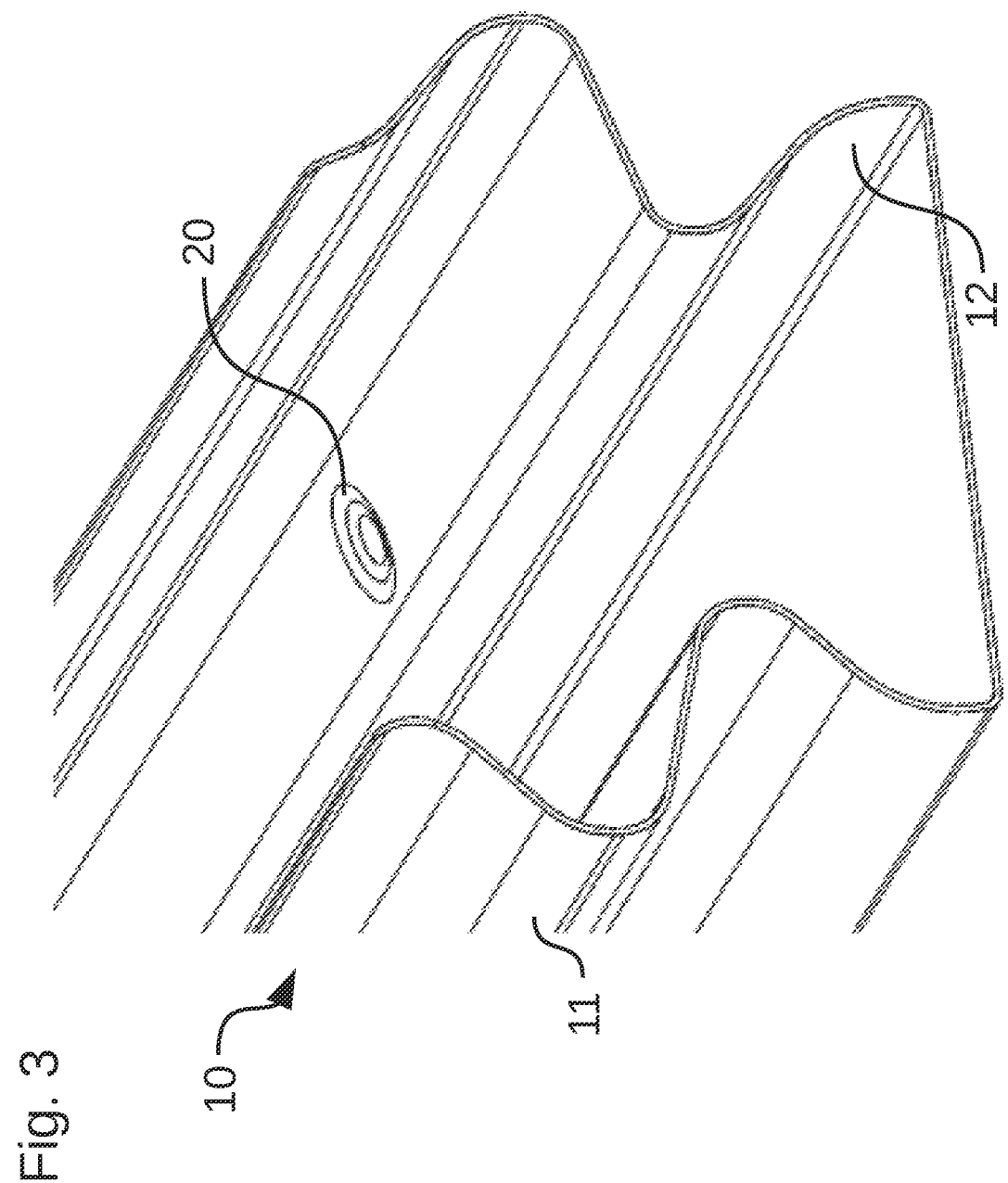
FIG. 3 is a perspective view of a further embodiment of the intermediate element according to the invention.

FIG. 3 is a perspective view of a further embodiment of the intermediate element 10 according to the invention. In FIG. 3, the extent of the intermediate element 10 in parallel with the axis of rotation of the rotor can be seen. FIG. 3 only shows part of the intermediate element 10. The full extension of the intermediate element 10 in parallel with the axis of rotation of the rotor cannot be seen in FIG. 3. Along the axis of rotation of the rotor, the intermediate element 10 has a height or extension that corresponds to the height of the blade root 30 along the axis of rotation of the rotor. The height runs perpendicularly to the plane of the drawing in FIG. 2.

The recess in the intermediate element 10 is formed in the manner of a flattened dome. The recess on the inside or inner surface 12, which recess has a corresponding protrusion 20-22 on the outside or outer surface 11, is located in a planar or flat portion (not having the recess) of the intermediate element 10. The recess or protrusion 20-22 is located in the middle of the planar portion, i.e. the distance from the protrusion 20-22 to the planar-portion end that is further away from the axis of rotation of the rotor is the same as the distance from the protrusion 20-22 to the planar-portion end that is closer to the axis of rotation of the rotor.

Figure 4:
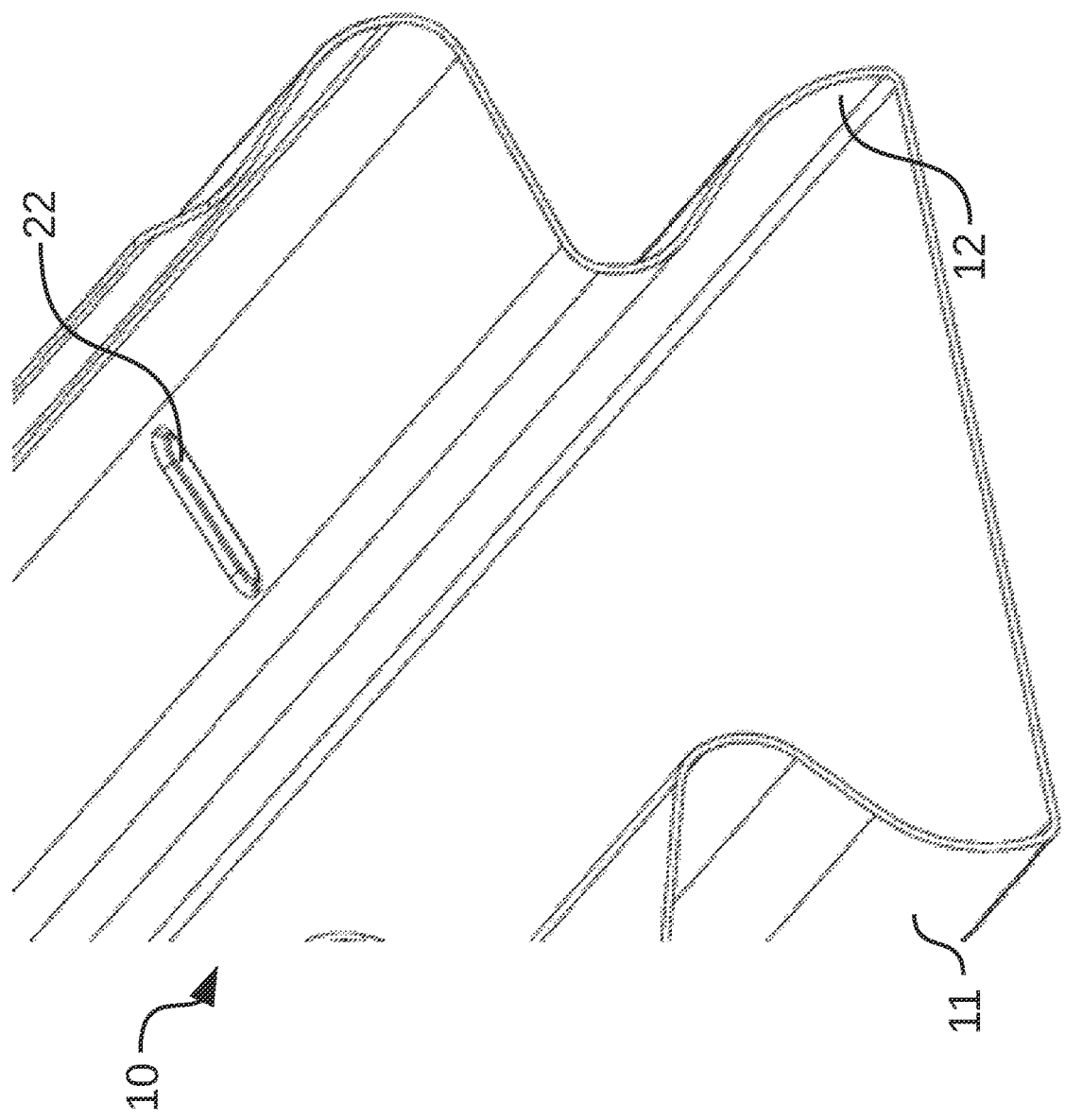
FIG. 4 is a perspective view of a further embodiment of the intermediate element according to the invention.

FIG. 4 is a perspective view of a further embodiment of the intermediate element 10 according to the invention. FIG. 4 only shows part of the intermediate element 10. The full extension of the intermediate element 10 in parallel with the axis of rotation of the rotor cannot be seen in FIG. 4.

The protrusion 20-22, and thus also the recess visible in FIG. 4, is elongate. In cross section in a plane perpendicular to the axis of rotation of the rotor, the recess or protrusion 22 appears to be rectangular (cf. FIG. 2). The recess extends over substantially the entire width of a planar portion of the intermediate element 10. The width of the planar portion of the intermediate element 10 runs in a plane that runs perpendicularly to the axis of rotation of the rotor. Along the axis of rotation of the rotor, the recess, and thus also the protrusion 22, has only a small length or size by comparison with its width.

The recess or protrusion 22 is substantially rectangular parallelepiped-shaped, the wall of the recess being able to comprise a plurality of edges. The recess can thus merge into the planar portion of the intermediate element 10 over a plurality of edges.

Figure 5:
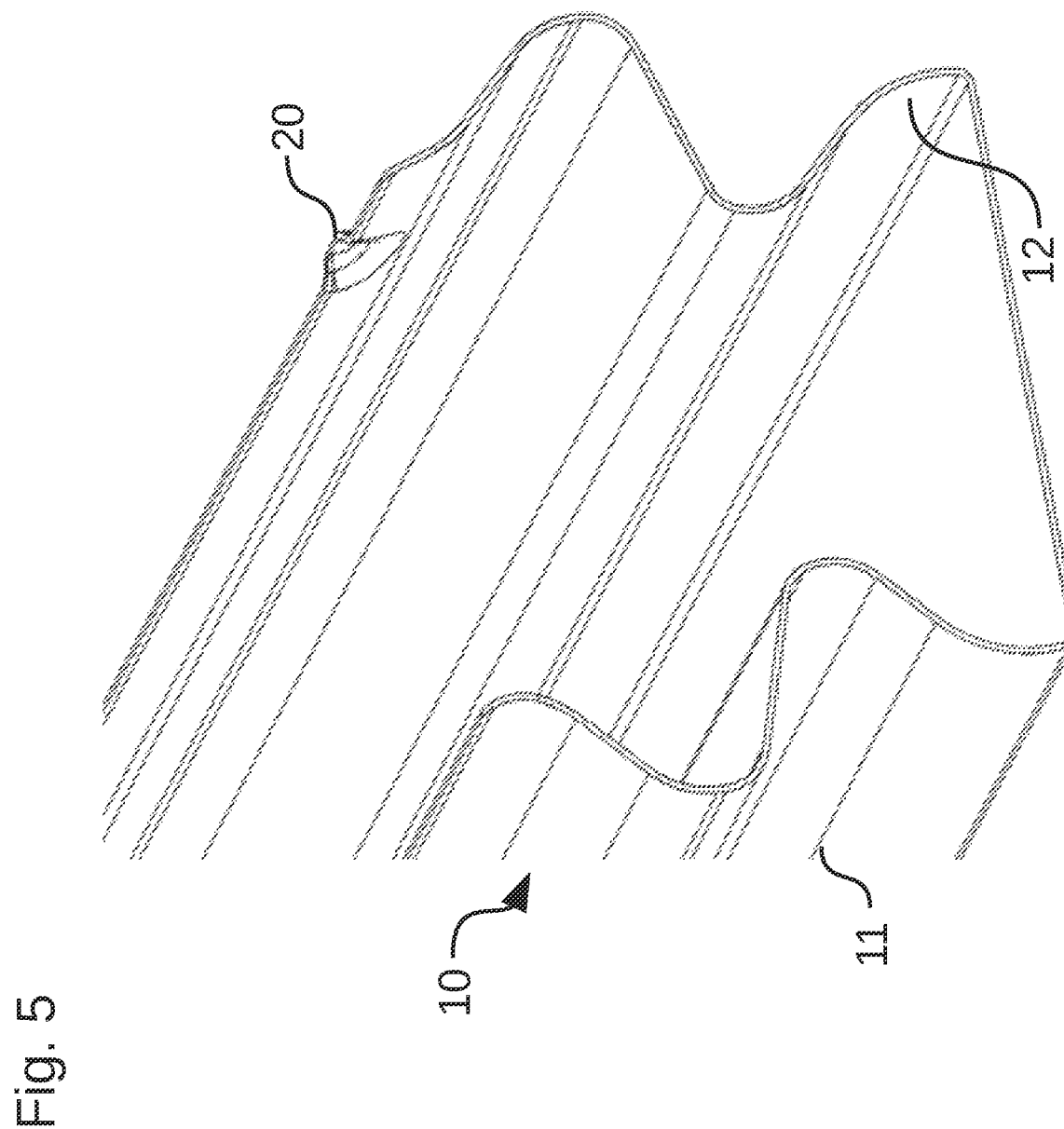
FIG. 5 is a perspective view of a further embodiment of the intermediate element according to the invention.

FIG. 5 is a perspective view of a further embodiment of the intermediate element 10 according to the invention. FIG. 5 only shows part of the intermediate element 10. The full extension of the intermediate element 10 in parallel with the axis of rotation of the rotor cannot be seen in FIG. 5.

In the embodiment shown in FIG. 5, the protrusion 20-22 or recess is located on the upper edge or upper end of the intermediate element 10. The upper edge of the intermediate element 10 is located on an end facing away from the axis of rotation of the rotor.

The recess or depression is usually produced by indenting the edge at one point or in one portion. In FIG. 5, the recess is of a flattened dome-like shape. In relation to FIG. 2, this recess, or the protrusion 20-22, would be located in the region of a free surface 15-17, namely the top free surface 15. Here, the distance between the intermediate element 10 and the rotor disk 40 (without taking account of the protrusion 20-22) is particularly great.

The protrusion 20-22 or the recess can each extend over the planar portion as far as into the curved portion of the intermediate element 10. The free surfaces 15-17 are usually formed in this curved portion of the intermediate element 10, i.e. the intermediate element 10 does not touch the rotor disk 40 and is often at a great distance from the rotor disk 40 here.

In particular, the intermediate element 10 can have a small thickness, the thickness being measured from the axis of rotation of the rotor toward the blade 35 or blade root 30. By way of example, the thickness of the intermediate element 10 can be in the range from approximately 1 mm to approximately 5 mm, in particular in the range from approximately 2 mm to approximately 4 mm, e.g. approximately 3 mm. The intermediate element 10 can thus be in the form of a (metal) sheet.

The recess or the protrusion 20-22 can be in the form of a corrugation in the intermediate element 10.

Each protrusion 20-22 or each recess is usually formed point-symmetrically in relation to the middle of each protrusion 20-22 or each recess. However, it is also conceivable for each protrusion 20-22 or each recess to have an asymmetrical shape.

LIST OF REFERENCE NUMERALS

10 Intermediate element
11 Outer surface
12 Inner surface
15-17 Free surface
20-22 Protrusion
30 Blade root
35 Blade
40 Rotor disk
42, 43 Bumps on the rotor disk
50 Axial securing sheet
60 Plane of symmetry

The invention claimed is:

1. An intermediate element for a blade/rotor disk connection in a rotor of a fluid flow machine, the intermediate element being adapted to a shape of a blade root of a blade and to a blade root slot in a rotor disk for receiving the blade root in such a way that, when in a state arranged between the blade root and the rotor disk, the intermediate element prevents direct contact between the blade root and the rotor disk, the intermediate element comprising, on an outer surface that faces the rotor disk in the state arranged between the blade root and the rotor disk, at least one protrusion configured to reduce an air flow parallel to an axis of rotation of the rotor between the rotor disk and the intermediate element; and on an inner surface that faces the blade root in the state arranged between the blade root and the rotor disk, a recess that corresponds to the at least one protrusion on the outer surface of the intermediate element,
wherein, in the arranged state, the at least one protrusion is arranged in a region of a non-load-bearing flank of the blade root.

2. The intermediate element according to claim 1, wherein the intermediate element is in the form of an anti-wear sheet, having an axial sectional contour that corresponds to an axial sectional contour of the blade root, which has a fir-tree profile.

3. The intermediate element according to claim 1, wherein, the intermediate element is configured such that, when in the arranged state, the intermediate element entirely surrounds the blade root at the surface thereof facing the blade root slot.

4. The intermediate element according to claim 1 wherein on the outer surface that faces the rotor disk in the state arranged between the blade root and the rotor disk, the intermediate element comprises a plurality of protrusions configured to reduce the air flow parallel to the axis of rotation of the rotor between the rotor disk and the intermediate element; and on the inner surface facing the blade root, a plurality of recesses that respectively each correspond to the respective protrusions, the plurality of protrusions comprising the at least one protrusion and the plurality of recesses comprising the recess.

5. The intermediate element according to claim 4, wherein in the state arranged between the blade root and the rotor disk, at least some of the plurality of protrusions are arranged next to one another in a sectional plane perpendicular to the axis of rotation of the rotor disk.

6. The intermediate element according to claim 4, wherein, in the state arranged between the blade root and the rotor disk, the plurality of protrusions are arranged at different heights along the axis of rotation of the rotor.

7. The intermediate element according to claim 1, wherein the at least one protrusion includes a plurality of protrusions, and
wherein, in the arranged state, at least one of the plurality of protrusions is arranged in a region of a bottom of the blade root slot, and extends away from the blade root.

8. The intermediate element according to claim 1, wherein the at least one protrusion is in a shape of a flattened dome.

9. The intermediate element according to claim 1, wherein, in the state arranged between the blade root and the rotor disk, the at least one protrusion is of a rectangular shape in a sectional plane perpendicular to the axis of rotation of the rotor disk.

10. The intermediate element according to claim 1, wherein, in the state arranged between the blade root and the rotor disk, the at least one protrusion is arranged on an end of the intermediate element facing away from the axis of rotation of the rotor.

11. The intermediate element according to claim 1, wherein, in the state arranged between the blade root and the rotor disk, an axial securing sheet, configured to axially secure or radially preload the blade root, is arranged between an end of the intermediate element facing the axis of rotation of the rotor and the rotor disk.

12. The intermediate element according to claim 1, wherein the at least one protrusion is formed in a planar portion of the intermediate element.

13. The intermediate element according to claim 12 wherein the at least one protrusion runs over an entire width of the planar portion of the intermediate element, and
wherein the width of the planar portion extends in a sectional plane that runs perpendicularly to the axis of rotation of the rotor disk.

14. The rotor for the fluid flow machine, wherein the rotor comprises the rotor disk and a multiplicity of blades, comprising the blade, fastened to the rotor disk, and
wherein the intermediate element according to claim 1 is arranged between at least one blade root of the blade and the rotor disk in such a way that the blade root does not directly touch the rotor disk.

15. The fluid flow machine comprising the rotor according to claim 14.

16. The intermediate element according to claim 1, wherein the fluid flow machine is an engine.

17. The intermediate element according to claim 1, wherein the intermediate element is in the form of an anti-wear sheet, having an axial sectional contour that corresponds to an axial sectional contour of the blade root, which has a dovetail profile.

18. The intermediate element according to claim 1, wherein the intermediate element is in the form of an anti-wear sheet, having an axial sectional contour that corresponds to an axial sectional contour of the blade root, which has a hammerhead profile.

* * * * *